United States Patent [19]

Ebata et al.

[11] Patent Number: 4,529,459

[45] Date of Patent: Jul. 16, 1985

[54] ADHESIVE FOR MUTUAL UNION OF OXIDE TYPE CERAMIC ARTICLES AND METHOD FOR MANUFACTURE THEREOF

[75] Inventors: Yoshihiro Ebata, Kawanishi; Makoto Kinoshita, Ikeda; Ryozo Hayami, Takarazuka all of Japan

[73] Assignee: Agency of Industrial Science & Technology, Ministry of International Trade & Industry, Tokyo, Japan

[21] Appl. No.: 543,106

[22] Filed: Oct. 18, 1983

[30] Foreign Application Priority Data

Dec. 2, 1982 [JP] Japan ................... 57-212267

[51] Int. Cl.$^3$ ............................................. C03B 29/00
[52] U.S. Cl. .......................................... 156/89; 65/43;
106/1.23; 106/1.26; 106/286.7; 156/325;
428/697; 428/701; 501/153; 501/154

[58] Field of Search ................ 156/89, 325; 106/1.23,
106/1.26, 286.7; 428/697, 701; 501/153, 154;
65/43

[56] References Cited

U.S. PATENT DOCUMENTS 4,269,641  5/1981  Ebata et al. ...................... 156/89

Primary Examiner—John J. Gallagher
Attorney, Agent, or Firm—Kurt Kelman

[57] ABSTRACT

An adhesive agent having, as its active components, copper sulfide and at least one member selected from the group consisting of alumina, silica, and kaoline enables the opposed surfaces of two oxide-type ceramic articles to be joined to each other with high adhesive strength, this fast union being accomplished by interposing the adhesive agent between the opposed surfaces of the ceramic articles and heating the adhesive agent to a temperature of not less than 1000° C.

9 Claims, No Drawings

ADHESIVE FOR MUTUAL UNION OF OXIDE TYPE CERAMIC ARTICLES AND METHOD FOR MANUFACTURE THEREOF

BACKGROUND OF THE INVENTION:

This invention relates to an adhesive agent for mutual union of two oxide type ceramic articles and to a method for the manufacture of this adhesive agent.

Heretofore, mutual adhesion of two oxide type ceramic articles has been accomplished by adopting a method which comprises interposing a metal between the opposed surfaces of these ceramic articles and filling up the intervening gap with silver solder (Japanese Patent Publication Sho 47(1972)-21569) or a solder glass method, for example. The former method entails time-consuming and complicated work because it requires interposition of a metal. Besides, this method is not workable when the ceramic articles to be joined have complicated shapes. Since the latter method uses a solder which is preponderantly formed of glass, it has the disadvantage that the solder sustains breakage under thermal strain, offers insufficient thermal resistance, and suffers heavy degradation of its ability to resist chemicals because of the occurrence of an alkali upon vitrification.

For the union of ceramic articles in general including articles of oxide type ceramics, some of the present inventors participated in perfecting earlier inventions. One of these is the invention of U.S. Pat. No. 4,293,356 which concerns an adhesive agent formed of a mixture of CuS, LaCrO$_3$, SiO$_2$, and Cu. Two others are the inventions of U.S. Pat. No. 4,486,257, granted Dec. 4, 1984 and U.S. Pat. No. 4,447,283, granted May 8, 1984 which concern adhesive agents respectively formed preponderantly of calcium fluoride or a mixture of calcium fluoride with kaoline and of an alkali fluoride or a mixture of an alkali fluoride with kaoline. All these adhesive agents exhibit contact strengths of not more than about 100 kg/cm$^2$. As the use found for ceramics is now expanding, ceramic articles are now required to be available in a wide variety of shapes. In the circumstance, the adhesive agents used for mutual adhesion of these ceramic articles are naturally expected to offer ample adhesive strength.

One object of this invention is to provide an adhesive agent capable of joining two oxide type ceramic articles with high adhesive strength.

Another object of this invention is to provide a method for joining two oxide type ceramic articles to each other with high adhesive strength.

SUMMARY OF THE INVENTION

To attain the objects mentioned above, the inventors made a diligent study. They have consequently found that in the aforementioned invention of U.S. Pat. No. 4,293,356, the adhesive agent exhibits more than three times as high adhesive strength when incorporation of lanthanum chromite and powdered copper is omitted, that silica can be replaced by alumina or kaoline or can be used together with alumina and/or kaoline, and that the adhesive agent is not always required to be prepared in the form of paste and the heating is not required to be carried out under an oxidizing atmosphere when the substitution is made. This invention has been perfected on the basis of this knowledge.

Specifically, this invention relates to an adhesive agent for mutual adhesion of two oxide type ceramic articles which has as principal components thereof copper sulfide and at least one member selected from the group consisting of alumina, silica, and kaoline and to a method for the mutual adhesion of two oxide type ceramic articles which is characterized by interposing the adhesive agent mentioned above between the opposed surfaces of the two oxide type ceramic articles and heating the adhesive agent to a temperature of not less than 1000° C.

DESCRIPTION OF THE PREFERRED EMBODIMENT:

The adhesive agent of the aforementioned invention of U.S. Pat. No. 4,293,356 is greatly increased in its adhesive strength by omitting incorporation of lanthanum chromite and powdered copper. Although this improvement in the adhesive strength can possibly be explained as stated later, the true reason therefor remains yet to be elucidated. As demonstrated in the working examples cited afterward, the adhesive agent of the present invention unmistakably shows more than three times as high adhesive strength as the adhesive agent of the U.S. patent mentioned above.

The adhesive agent of this invention is supposed to fulfill its function through the following mechanism. Since it is heated to a temperature exceeding 1000° C., the copper sulfide is decomposed into sulfur and copper and this copper combines with alumina and/or silica to give rise to a two-component or three-component adhesive phase and, at the same time, the sulfur permeates oxide type ceramic articles and the aforementioned adhesive phase is caused simultaneously to pass and spread into the ceramic articles. Since this adhesive phase has a relatively low melting point, it is in a molten state when the adhesive agent is heated to the aforementioned temperature. Thus, the molten adhesive phase, with cooperation from the sulfur, is allowed to permeate the ceramic articles smoothly. In this manner, the adhesive agent of this invention enjoys improved adhesive strength.

According to the inventors' own experiment, the adhesive agent suffers from heavy loss of adhesive strength when the copper sulfide is replaced by some other copper compound such as, for example, copper carbonate, copper oxide, or copper chloride or when alumina, silica, or kaoline is replaced by zirconia or magnesia. This decline of the adhesive strength may possibly result from the absence of the aforementioned low-melting adhesive phase and the unavailability of the cooperation of sulfur.

In the preparation of the adhesive agent of this invention, copper sulfide and alumina, silica, and/or kaoline are used in their powdered form, desirably in a particle size of not more than 3 μm. Although these raw materials are desired to have as high purity as permissible, use of such raw materials as are normally commercially available suffices for the purpose of this invention.

By "kaoline" is meant a clay (for pottery) having an average chemical composition of Al$_2$O$_3$.2SiO$_2$.2H$_2$O. Kaoline, when heated to about 600° C., is decomposed with liberation of water of crystallization. Typical commercial products available in Japan are Kampaku Kaoline and Chosen Kaoline (of high purity).

Generally, copper sulfide and at least one member selected from the group consisting of alumina, silica, and kaoline are desired to be used in proportions such that the former will account for 30 to 98% by weight and the latter for 70 to 2% by weight respectively based on the total amount of their mixture. Preferably, the proportions are 90% by weight of the former and 10% by weight of the latter.

In working the present invention, copper sulfide and at least one member selected from the group consisting of alumina, and kaoline are thoroughly mixed at a ratio within the range described above. The resultant mixed powder may be used immediately in its unaltered form. Otherwise, it may be transformed into paste by addition thereto of a suitable binder and a solvent therefor such as, for example, screen oil or printing ink, and balsam before it is put to use.

The adhesive agent obtained in the form of powder or paste as described above is interposed generally in an amount of 0.5 to 3 $g/cm^2$, preferably 1 to 2 $g/cm^2$, as principal components between the opposed surfaces of two oxide type ceramic articles and then heated to and maintained at a temperature in the range of about 1000° to 1300° C., preferably 1050° to 1200° C., for a period of about 10 to 60 minutes. Consequently, the ceramic articles are joined with great strength. If the temperature is lower, the decomposition of copper sulfide is not enough to ensure fast mutual adhesion. If it is higher, there is the possibility of the adhesive phase flowing out of the adhesive agent. This application of heat may be advantageously carried out in the atmosphere. It is not required to be performed under the blanket of an oxidizing gas. The heating treatment does not call for use of any pressure means. Slight application of pressure may be desirable for the purpose of ensuring airtight contact between the opposed surfaces of the ceramic articles under treatment.

The kinds of oxide type ceramics for which this invention provides effective mutual adhesion are not specifically limited. Fast mutual adhesion is offered to ceramics of alumina, mullite ceramics, and ceramics of magnesia, zirconia, cordielite, and beryllia.

In accordance with this invention, two oxide type ceramic articles are joined fast by a simple operation of just one heating. The adhesive strength is generally not less than 1500 $kg/cm^2$, a level more than three times as high as the level obtainable by any conventional adhesive agent. The adhesive agent of this invention is capable of readily joining ceramic articles of complicated shape and the adhesive layer formed in the joined ceramic articles excels in resistance to chemicals and in resistance to thermal shocks.

Now, the present invention will be described more specifically below with reference to working examples.

EXAMPLE 1

A pasty adhesive agent was obtained by mixing 90% by weight of powdered copper sulfide (having a particle size of not more than 3 $\mu$m; the same applies hereinafter) with 10% by weight of powdered kaoline (having a particle size of not more than 3 $\mu$m) and then mixing 100 parts by weight of the resultant mixed powder with 15 parts by weight of screen oil. This adhesive agent was interposed at a rate of 1 $g/cm^2$ as principal components between two zirconia plates and maintained at 1100° C. for 30 minutes in the air to join the plates.

A test piece of the joined plates thus obtained was tested for adhesive strength by the three-point load bending method under the conditions of 20 mm of span and 0.5 mm/min. of load application speed. Thus, the adhesive strength was found to be 1880 $kg/cm^2$.

Another test piece was immersed in an aqueous 48% potassium hydroxide solution at 70° C. for 50 hours to test for resistance to chemicals. At the end of the immersion, the test piece was found to have sustained no change of any sort in the portion of adhesion.

This test piece was heated again to 1100° C. and suddenly cooled in cold water to test for resistance to thermal shock. This harsh treatment produced no change of any sort in the portion of adhesion.

EXAMPLE 2

Mutual adhesion was tried by following the procedure of Example 1, except that alumina plates were used in the place of zirconia plates.

A test piece of the resultant joined plates was found by test to possess adhesive strength of 2010 $kg/cm^2$. Under the same test conditions as used in Example 1, this test piece showed high resistance to chemicals and to thermal shock.

EXAMPLE 3

An adhesive agent was obtained by mixing 90% by weight of powdered copper sulfide with 10% by weight of powdered kaoline (having a particle size of not more than 3 $\mu$m). This adhesive agent was interposed at a rate of 1 $g/cm^2$ between the opposed surfaces of two zirconia plates and maintained at 1100° C. for 30 minutes in the air, to join the two plates.

A test piece of the joined plates was found by test to possess adhesive strength of 1860 $kg/cm^2$. Under the same test conditions as used in Example 1, this test piece showed high resistance to chemicals and to thermal shock.

EXAMPLE 4

An adhesive agent was obtained by mixing 90% by weight of powdered copper sulfide with 10% by weight of powdered alumina (having a particle size of not more than 3 $\mu$m). This adhesive agent was interposed at a rate of 1 $g/cm^2$ between the opposed surfaces of two zirconia plates and heated at 1100° C. for 30 minutes in the air to join the two plates.

A test piece of the joined plates was found by test to possess adhesive strength of 1890 $kg/cm^2$. Under the same test conditions as used in Example 1, it showed high resistance to chemicals and to thermal shock.

EXAMPLE 5

An adhesive agent was obtained by mixing 90% by weight of powdered copper sulfide with 5% by weight of powdered alumina (having a particle size of not more than 3 $\mu$m) and 5% by weight of powdered silica (having a particle size of not more than 3 $\mu$m). This adhesive agent was interposed at a rate of 1 $g/cm^2$ between the opposed surfaces of two zirconia plates and maintained at 1100° C. for 30 minutes in the air, to join the two plates.

A test piece of the joined plates was found by test to possess adhesive strength of 1790 $kg/cm^2$. Under the same test conditions as used in Example 1, this test piece showed high resistance to chemicals and to thermal shock.

EXAMPLE 6

An adhesive agent was obtained by mixing 90% by weight of powdered copper sulfide with 10% by weight of powdered silica (having a particle size of not more than 3 $\mu$m). This adhesive agent was interposed at a rate of 1 g/cm² between the opposed surfaces of two zirconia plates and maintained at 1100° C. for 30 minutes, to join the two plates.

A test piece of the joined plates was found by test to possess adhesive strength of 2050 kg/cm². Under the same test conditions as used in Example 1, this test piece showed high resistance to chemicals and to thermal shock.

EXAMPLE 7

Adhesive agents were prepared by following the procedure of Example 1, except that the proportions of powdered copper sulfide and powdered kaoline were varied as indicated in Table 1. The adhesive agents were tested for adhesive strength. The results were as shown in Table 1.

TABLE 1

| | | | |
|---|---|---|---|
| Powdered copper sulfide (% by weight) | 95 | 70 | 40 |
| Powdered kaoline (% by weight) | 5 | 30 | 60 |
| Adhesive strength (kg/cm²) | 1780 | 1650 | 1800 |

Under the same test conditions as used in Example 1, the test pieces of the joined plates showed high resistance to chemicals and to thermal shocks.

EXAMPLE 8

Adhesive agents were prepared by following the procedure of Example 4, except that the proportions of powdered copper sulfide and powdered alumina were varied as indicated in Table 2. The results were as shown in the same table.

TABLE 2

| | | | |
|---|---|---|---|
| Powdered copper sulfide (% by weight) | 97 | 65 | 35 |
| Powdered alumina (% by weight) | 3 | 35 | 65 |
| Adhesive strength (kg/cm²) | 1540 | 1945 | 1480 |

Under the same test conditions as used in Example 1, the test pieces showed high resistance to chemicals and to thermal shocks.

COMPARATIVE EXPERIMENT 1

Adhesive agents were prepared by following the procedure of Example 1, except that the proportions of the powdered raw materials were varied as indicated in Table 3. The results were as shown in the same table.

TABLE 3

| | | |
|---|---|---|
| Powdered copper sulfide (% by weight) | 99 | 20 |
| Powdered kaoline (% by weight) | 1 | 80 |

TABLE 3-continued

| | | |
|---|---|---|
| Adhesive strength (kg/cm²) | 405 | 140 |

COMPARATIVE EXPERIMENT 2

Adhesive agents were prepared by following the procedure of Example 4, except that the proportions of the powdered raw materials were varied as indicated in Table 4. The results were as shown in the same table.

TABLE 4

| | | |
|---|---|---|
| Powdered copper sulfide (% by weight) | 98.5 | 15 |
| Powdered alumina (% by weight) | 1.5 | 85 |
| Adhesive strength (kg/cm²) | 515 | 90 |

What is claimed is:

1. A method for mutual adhesion of two oxide type ceramic articles, comprising the steps of interposing between the opposed surfaces of said ceramic articles an adhesive agent consisting essentially of copper sulfide and at least one member selected from the group consisting of alumina, silica, and kaoline and maintaining said adhesive agent at a temperature of not less than about 1000° C.

2. A method according to claim 1, wherein said adhesive agent is maintained at a temperature in the range of about 1000° to 1300° C.

3. A method according to claim 1, wherein said copper sulfide accounts for 30 to 98% by weight and at least one member selected from the group consisting of alumina, silica, and kaoline accounts for 70 to 2% by weight, respectively based on the amount of the mixture thereof.

4. A method according to claim 1, wherein the principal components are both in a powdered form.

5. A method according to claim 1, wherein said adhesive agent is transformed into paste by incorporation of additives to the principal components thereof.

6. An adhesive agent for mutual adhesion of two oxide type ceramic articles, consisting essentially of copper sulfide and at least one member selected from the group consisting of alumina, silica, and kaoline.

7. An adhesive agent according to claim 1, wherein copper sulfide accounts for 30 to 98% by weight and at least one member selected from the group consisting of alumina, silica, and kaoline accounts for 2 to 70% by weight, respectively based on the amount of the mixture thereof.

8. An adhesive agent according to claim 1, wherein the principal components are both in a powdered form.

9. An adhesive agent according to claim 1, wherein said adhesive agent is transformed into paste by incorporation of additives to the principal components thereof.

* * * * *